US010901880B1

(12) United States Patent
Bernard et al.

(10) Patent No.: US 10,901,880 B1
(45) Date of Patent: Jan. 26, 2021

(54) API MONITORING AND VALIDATION FOR ONBOARDED APPLICATIONS

(71) Applicant: Capital One Services, LLC, McLean, VA (US)

(72) Inventors: Nimesh Bernard, Aldie, VA (US); Mahendher Govindasingh Krishnasingh, Brambleton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/575,210

(22) Filed: Sep. 18, 2019

(51) Int. Cl.
*G06F 11/00* (2006.01)
*G06F 11/36* (2006.01)
*G06F 9/54* (2006.01)
*G06F 11/32* (2006.01)
*G06F 11/34* (2006.01)

(52) U.S. Cl.
CPC ............ *G06F 11/3688* (2013.01); *G06F 9/54* (2013.01); *G06F 11/327* (2013.01); *G06F 11/3476* (2013.01)

(58) Field of Classification Search
CPC ............... G06F 11/3688; G06F 11/327; G06F 11/3476; G06F 11/0709; G06F 11/079; G06F 11/0766; G06F 11/0781; G06F 11/3006; G06F 11/3065; G06F 9/54
See application file for complete search history.

(56) References Cited

U.S. PATENT DOCUMENTS

| | | | |
|---|---|---|---|
| 2015/0128156 A1* | 5/2015 | Zhu ....................... | G06F 11/302 719/328 |
| 2017/0147681 A1* | 5/2017 | Tankersley ............ | G06F 11/321 |
| 2018/0039570 A1* | 2/2018 | Rajagopalan ....... | G06F 11/3688 |

* cited by examiner

*Primary Examiner* — Joseph D Manoskey
(74) *Attorney, Agent, or Firm* — Kacvinsky Daisak Bluni PLLC

(57) ABSTRACT

An API monitoring and validation tool that may be provided as part of a web-based application testing and deployment environment. The environment may enable developers to develop web-based applications, validate and test APIs used by the applications and deploy the applications. The API monitoring and validation tool may perform validation of a service endpoint used by an application. As part of the validation, a user may provide information regarding the form and content of a successful response to a call to the service endpoint is. The monitoring may measure performance metrics and obtain information regarding the causes of errors and failures. The monitoring can identify errors and failures that occur during API call chains to service endpoints.

14 Claims, 14 Drawing Sheets

API MONITORING AND VALIDATION FOR ONBOARDED APPLICATIONS

BACKGROUND

In conventional systems, when a developer wishes to deploy an application, the developer may wish to perform some testing and validation of the application and any related service endpoints. Typically, this requires the use of multiple separate tools and requires the manual writing of multiple scripts by the developer. In addition, such testing and validation may fail when API call chains are used or may be unable to identify the root cause of API call chain errors or failures.

SUMMARY

In an exemplary embodiment, a computer-implemented method is performed, such that programmatic validation of a web application is performed in a web-based environment. The web application employs application program interface (API) chaining for a chain of sequential API calls to endpoints. As part of the programmatic validation, a testing scenario that tests the API chaining is generated, wherein the testing scenario defines a successful response. The testing scenario that tests the API chaining is performed. Performance metrics resulting from executing the testing scenario are measured. Activity logs for the endpoints are programmatically analyzed to identify failures or problems that arose during the executing of the test scenario. An output is generated from a computing device containing information regarding any such identified problems or failures at the endpoints.

The testing scenario may be generated responsive to user input. The successful response may be defined by a regular expression. An unsuccessful response is one where the response does not match the regular expression.

The method may further include identifying causes of the failures or the problems and/or generating a report of the failures or problems as the output. The method may also include determining that there are no failures or problems and wherein the generating generates the output to indicate that there are no failures or problems.

In an exemplary embodiment, a computer-implemented method is performed in which content for a user interface is transmitted to a client in a web-based computing environment. The user interface enables scheduling of monitoring of a service endpoint during testing of the service endpoint. Scheduling input is received from the client. The scheduling input is obtained via the user interface and is indicative of dates and times at which monitoring of the service endpoint is to occur. Alert options are provided via the user interface to configure delivery of alerts for the service endpoint. The service endpoint is monitored responsive to the scheduling input. During the monitoring, an error is detected. An alert is generated. The alert is delivered in accordance with the information identifying how alerts are to be delivered. Log information regarding the error is gathered and output reporting the error and information regarding the error obtained from the log information is generated on a display device.

The scheduling input may specify a start date and an end date for the monitoring. The scheduling input may specify a frequency of the monitoring during a monitoring period. The user interface may be part of a webpage. The alert options may include at least one of email, text, a messaging application, pager, phone or an application program. The log information may be gathered from activity logs for multiple service endpoints.

The method may additionally include gathering metrics regarding the service endpoint during monitoring and displaying the metrics. At least one of the metrics may concern availability of the service endpoint. The metrics may include a measure of how often an application program interface (API) fails.

In an exemplary embodiment, a non-transitory computer-readable storage medium storing computer-executable instructions is provided. The instructions are for causing a computing device to perform a number of operations. The operations include obtaining a scenario for a service endpoint and validating the service endpoint to see if the response of the service endpoint to a request conforms with the scenario. The operations further include scheduling monitoring of the service endpoint and monitoring the service endpoint in accordance with the schedule, wherein the monitoring includes gathering metrics regarding the service endpoint, wherein the metrics include availability of the service endpoint over a monitored period and a measure of how often the service endpoint failed. The monitoring also includes examining logs to gather information regarding performance of the service endpoint. The operations additionally include generating output providing information regarding the metrics and the information gathered from the logs. The output may identify at least one pattern identified in the gathered log information by the pattern matching.

The medium may also store instructions for applying pattern matching to the gathered log information. The medium may store instructions for outputting information regarding results of applying the pattern matching. The output identifies at least one pattern identified in the gathered log information by the pattern matching.

DETAILED DESCRIPTION

Figure 1:
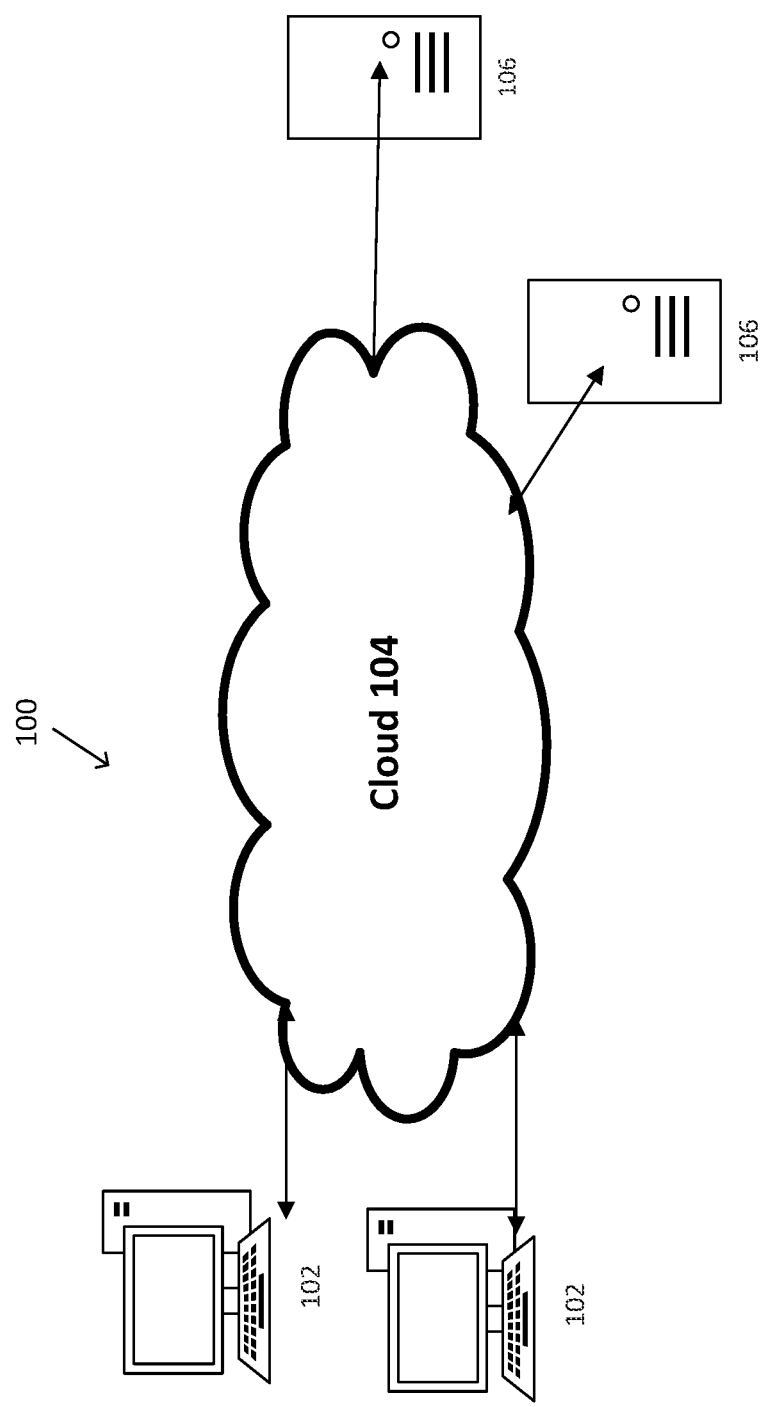
FIG. 1 depicts an illustrative computing environment suitable for practicing exemplary embodiments.

Exemplary embodiments described herein may relate to an API monitoring and validation component that may be provided as part of a web-based application testing and deployment environment. The environment may enable developers to develop web-based applications, validate and test APIs used by the applications and deploy the applications. In some exemplary embodiments, the environment may perform the testing and validation but not deployment. The exemplary embodiments may perform customizable validation and monitoring of service endpoints that are called by an application. The validation and monitoring may be performed automatically via programmable mechanisms once configured.

The API monitoring and validation component may perform validation of a service endpoint used by an application. As part of the validation, a user may provide information regarding what the form and content of a successful response to a call to the service endpoint is. This information may be expressed as a regular expression. For example, the regex ^[\t]+l[\t]+$ matches excess whitespace at the beginning or end of a line. The validation may then perform pattern matching validation. The pattern matching compares the actual response to a call to the service endpoint with the specified form and content of a successful response to determine whether there is a match. If there is a match, the response may be deemed to be successful. If there is not a match, the response may be deemed to be a failure. In some embodiments, sufficiently matching responses that are not exact matches may be deemed to be successful. The sufficiency of matching may be determined based on a threshold of matching of a specific criterion.

The API monitoring and validation component may provide a developer with options for specifying customized scheduling of monitoring of service endpoints. For instance, the API monitoring and validation component may provide a user interface that a developer may use to schedule monitoring. Via the user interface, a user may specify the date and times over which monitoring is performed. The user interface also may enable the developer to specify the frequency of monitoring. Once scheduled, the monitoring may be performed programmatically in an automated fashion.

The monitoring may measure performance metrics and obtain information regarding the causes of errors and failures. The metrics may include measures of availability of service endpoints, such as how often the service endpoint is operating properly and available. The metrics may also identify how often and when failures occur. Information may be programmatically extracted from logs at service endpoints regarding dates, times and causes or errors and failures. The results of the monitoring may be presented on a customizable dashboard. The dashboard may be customizable in that a developer may specify what information the developer may want to see (e.g., what metrics and log information) and may specify how the information is displayed (e.g., in text, in graphs or graphics, etc.). The aim in part may be to provide information via the dashboard that is useful to a developer to understand how the service endpoints called by an application are behaving and to help identify what is causing errors and failures. The monitoring may serve to confirm that the service endpoints called by the application are behaving properly during testing and that the application is ready for deployment.

The monitoring can identify errors and failures that occur during API call chains to service endpoints. In monitoring an API call chain, the API monitoring and validation component may keep track of the sequence of the API calls in the API call chain and examine downstream and/or upstream logs for the service endpoints to gather information regarding what truly caused an error or failure during an API call chain. For example, a failure at one API may be the result of a downstream service endpoint.

The API monitoring and validation component may process information regarding errors failures and the metrics to produce insights that may be useful to a developer. For instance, suppose that the API monitoring and validation component finds a pattern regarding patterns, such as there are a large number of failures at 6 pm on each Friday. The API monitoring and validation component may identify this pattern and may also identify that the failure is due to a call to a particular service endpoint. Such insights may be particularly useful to developer in making the application ready for deployment. Pattern matching may be deployed to achieve some of these insights.

It should be appreciated that the functionalities described herein need not be implemented by a singular tool or by code deemed a tool. Instead, in some embodiments the functionalities may be realized by multiple tools, pieces of code, modules, libraries or other programmatic mechanisms.

FIG. 1 depicts a bock diagram 100 of an environment suitable for practicing exemplary embodiments. This depiction is intended to be merely illustrative and not limiting. As shown in FIG. 1, client computing devices 102 interface with a cloud-based computing environment, such as the Internet or other private or hybrid web-based environment. Via the cloud 104, the client computing devices 102 may communicate with server computing devices 106 that interface with the cloud 104. The cloud 104 may represent a network or group of networks, including local area networks and/or wide area networks. The networks may be wired networks, wireless networks or a combination thereof. The client computing devices 102 may hold client code or a web browser for accessing a web application on one or more of the server computing devices 106. The client code or web application may be the API monitoring and validation tool or other software that provides the functionalities described herein.

In exemplary embodiments, a developer may wish to deploy an application that makes API calls to service endpoints on one of the server computing devices 106 or elsewhere on the cloud 104. The service endpoints may be accessible by applications via the Internet or via private or hybrid web-based environments, using an application layer protocol such as the HyperText Transfer Protocol (HTTP). The API monitoring and validation component performs validation and monitoring of the service endpoints prior to full deployment of the application.

Figure 2:
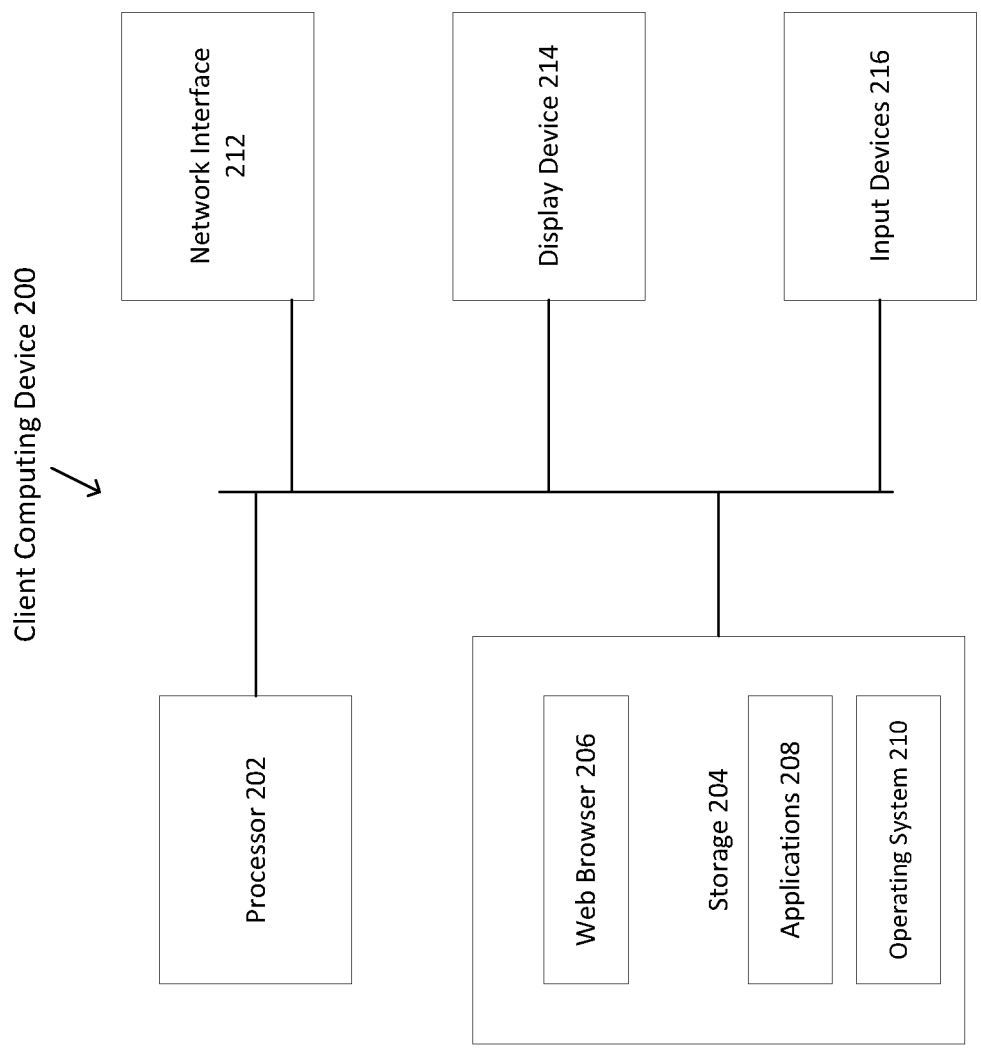
FIG. 2 depicts a block diagram of components of an illustrative client computing device.

FIG. 2 depicts an illustrative client computing device 200 in greater detail. The client computing device may take many different forms. For example, the client computing device may be a desktop computer, a laptop computer, a tablet computer, a mobile computing device, like a smart phone, a personal digital assistant (PDA), a server computing device, a smart television or other variety of computing device that includes a web browser. The client computing device 200 may include a processor 202 for executing computer-readable instructions. The processor 202 may include a microprocessor, such as a central processing unit (CPU) or a graphical processing unit (GPU), with one or more cores. Alternatively, the processor 202 may include an application specific integrated circuit (ASIC), a field programmable gate array (FPGA), a controller or other processing logic for performing the functionalities described herein.

The processor 202 has access to a storage 204. The storage may take many forms including but not limited to solid state storage, magnetic disk storage, optical disk storage, random access memory (RAM), read only memory (ROM), removable storage media, such as thumb drives, optical disks, magnetic disks and the like. The storage 204 may store data and computer-executable programming instructions. The storage 204 shown in FIG. 2 stores a web browser 206 that may include an HTML and/or XML interpreter. The web browser 206 may be executed by the processor and may be used to display web pages on a display device 214. The storage 204 may store applications 208 for execution by the processor 202. These applications 208 may include a client application for the API monitoring and validation tool and in some embodiments, may include the API monitoring and validation tool for execution on the client computing device 200. The storage 204 may also store an operating system 210 that is executed by the processor 202.

The client computing device may also include a network interface 212 for interfacing with a network, such as a local area network, and to gain access to the cloud 204. As mentioned above, the client computing device 200 may include a display device 214, such as retinal display, a liquid crystal display (LCD), a light emitting diode (LED) display or other suitable variety of display device. The client computing device 200 may also include input devices 216, such as a keyboard, mouse, pointing device, microphone or scanner.

Figure 3:
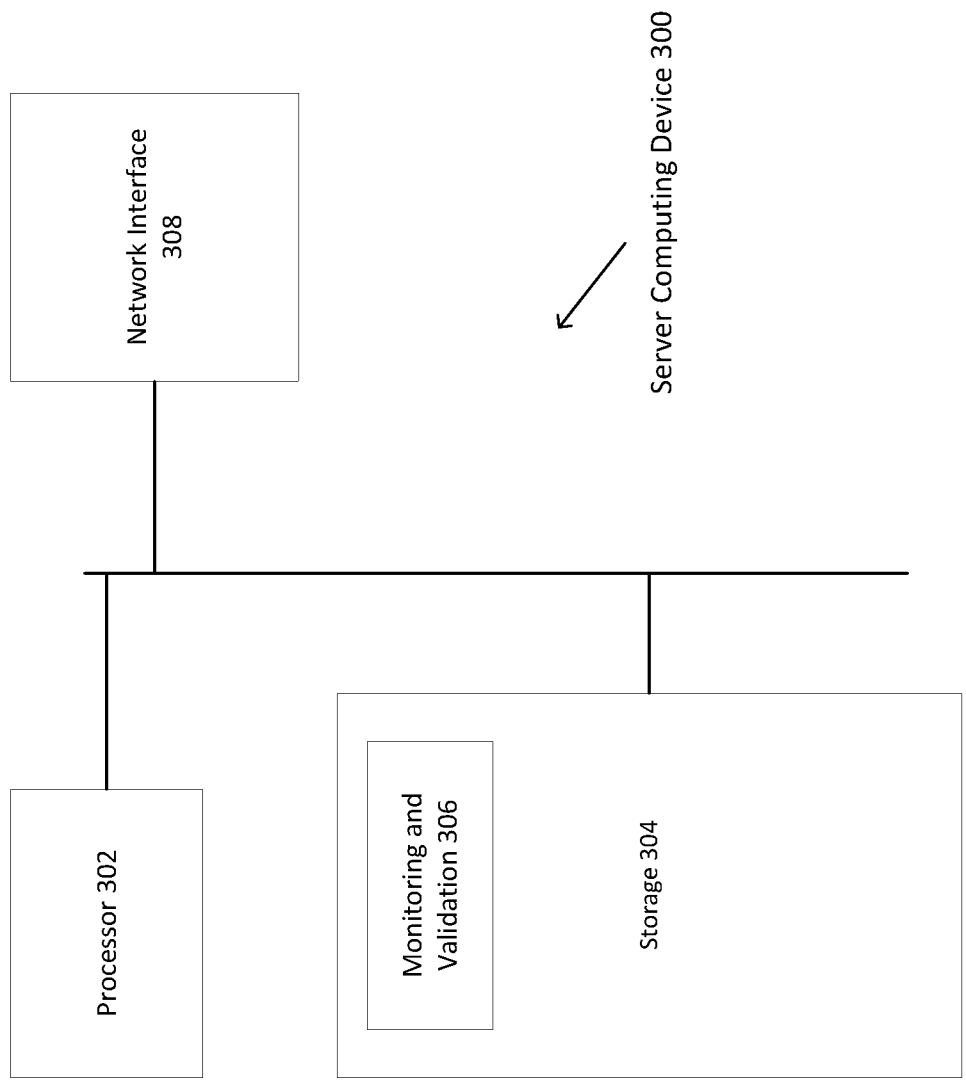
FIG. 3 depicts a block diagram of components of an illustrative server computing device.

FIG. 3 depicts a block diagram showing components of an illustrative server computing device 300. The server computing device 300 of FIG. 3 includes a processor 302. The processor may take many forms, like those discussed above relative to processor 202 of the client computing device 200. The server computing device 300 of FIG. 3 includes a storage 304. This storage 304 may take many different forms, such as those discussed above relative to storage 204. The storage 304 may store the software for performing the monitoring and validation 306 (e.g., the API monitoring and validation component). The server computing device 300 may include a network interface 308 for interfacing with a network to connect with the cloud 104 (FIG. 1).

Figure 4:
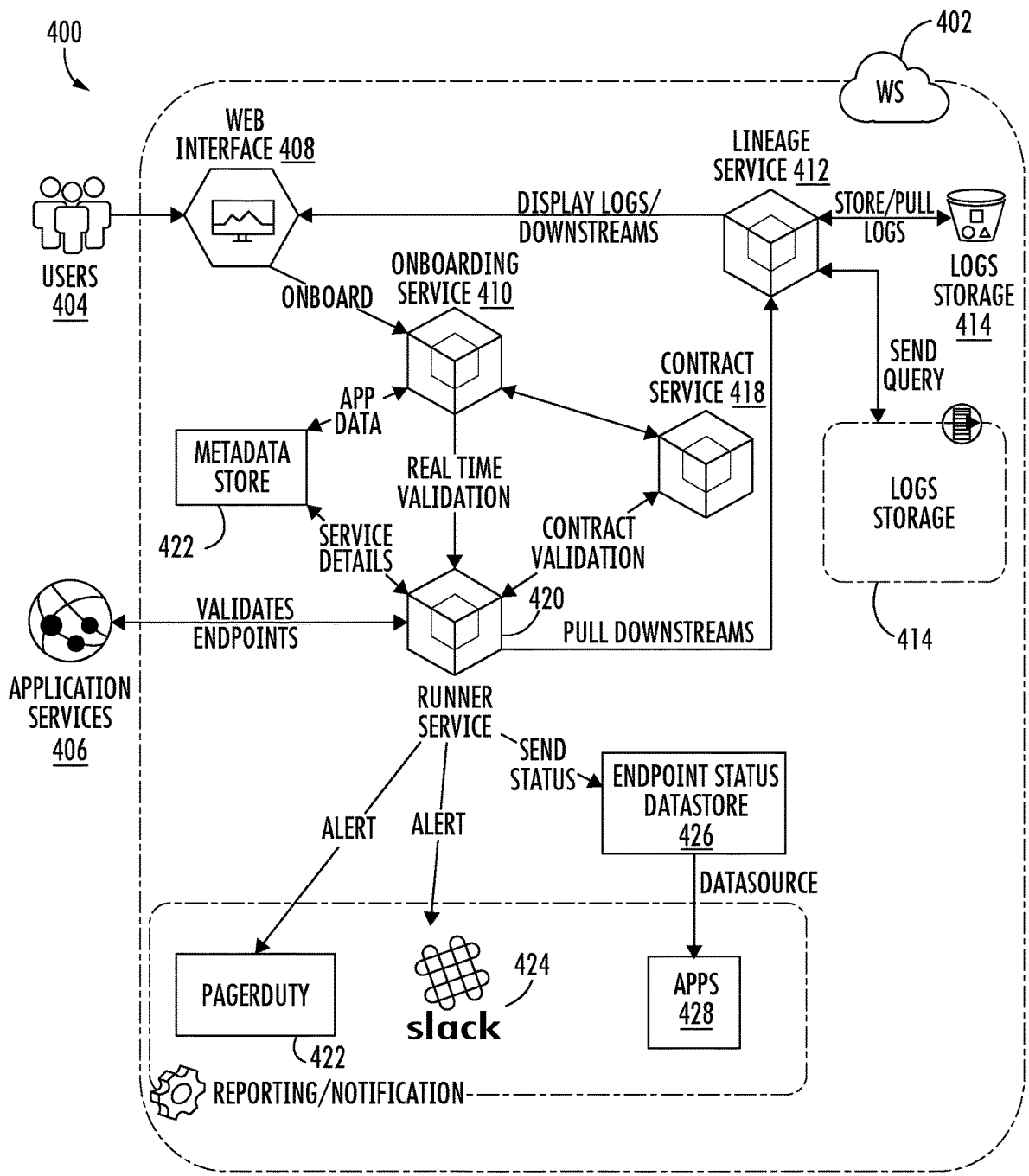
FIG. 4 depicts a diagram of an architecture for an API monitoring and validation component in an exemplary embodiment.

FIG. 4 depicts the API monitoring and validation component 400 of an exemplary embodiment in more detail. The API monitoring and validation component 400 may reside on a cloud platform 402, like those provided via Amazon Web Services from Amazon.com, Inc. or Microsoft Azure from Microsoft Corporation. As shown in FIG. 4, users 404, such as application developers, may communicate with the API monitoring and validation component 400 via a web interface 408 provided by the API monitoring and validation component 400. When a user 404 wishes to onboard an application, the user 404 onboards the application via the web interface 408 to an onboarding service 410. Application data provided by the user 404 regarding the application is stored in the meta data store 422. The API monitoring and validation tool 400 may include a contract service 418 for generating and managing service contracts. The service contracts may specify how the service can be accessed, where the service can be accessed, what are the capabilities of the service, what messages must be exchanged in order to engage operations and the form of those messages. This information may be captured in a schema (such as a JavaScript object notation (JSON) schema). This information may be used in validating responses provided by service endpoints as described above. Thus, a validation and monitoring component 420 may validate the service endpoints of the application services 406 (i.e., the services called by the onboarded application). The validation and monitoring 420 component may need to access logs that are accessible via a lineage service 412 that may store and pull log information from logs stored in a logs storage 414. Log information for the logs in the logs storage 414 may also be accessed by logging monitoring and analysis tools, like Splunk from Splunk Inc and Elastic from Elasticsearch B.V.

Status information regarding the application service endpoints gathered during monitoring may be stored in endpoint status datastore 426. The status data may be accessed from the endpoint status datastore 426 by applications 428 like Grafana from Grafana Labs to create the dashboard that shows the monitoring metrics and information referenced above. Alerts may be configured to be sent during monitoring to destinations such as a Slack (from Slack technologies, Inc.) 424 channel or to an application like PagerDuty that directs alerts to destinations or triggers responses. As will be described in more detail below, there may be a number of different types of alert destinations and these may be configurable. Those depicted are merely illustrative and are not intended to be limiting.

Figure 5:
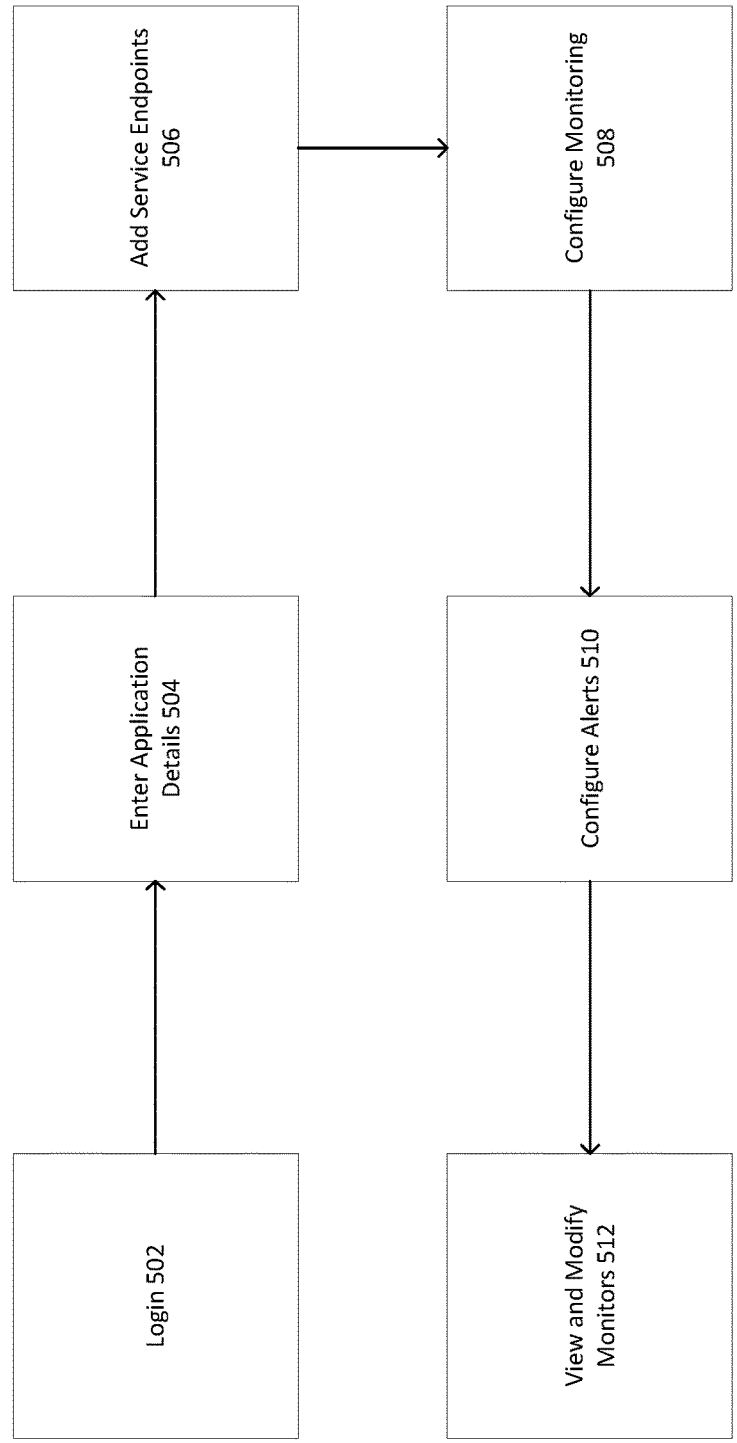
FIG. 5 depicts a diagram illustrating an overview of steps that may be taken by a user in exemplary embodiments.

FIG. 5 provides an overview of steps that may be performed in an exemplary embodiment for validating and monitoring an application that is to be deployed. Initially, a user, such as a developer, gains access to the API monitoring and validation component and is prompted to provide credentials to login 502. The API monitoring and validation component may be accessed by executing client code on the client computing device 200 (FIG. 2) or by accessing the appropriate website using a web browser 206 on the client computing device via the web interface 408 (FIG. 4). Once the login 502 has completed, the developer may enter details regarding the application 504. This application information may be stored in metadata store 422. The service endpoints are added 506 for the services of the application.

A user interface may be provided to configure the monitoring that is to be performed 508. The developer may specify the scheduling of the monitoring and what metrics are of interest and the like. The user interface may also enable the users to configure alerts 510 that may be generated from the monitor. The developer may specify what triggers alerts, what is contained in the alerts, and where the alerts are delivered, such as destinations 422 and 434 shown in FIG. 4. Once configured, the monitoring may be performed and monitors may be observed and modified as needed 512.

Figure 6:
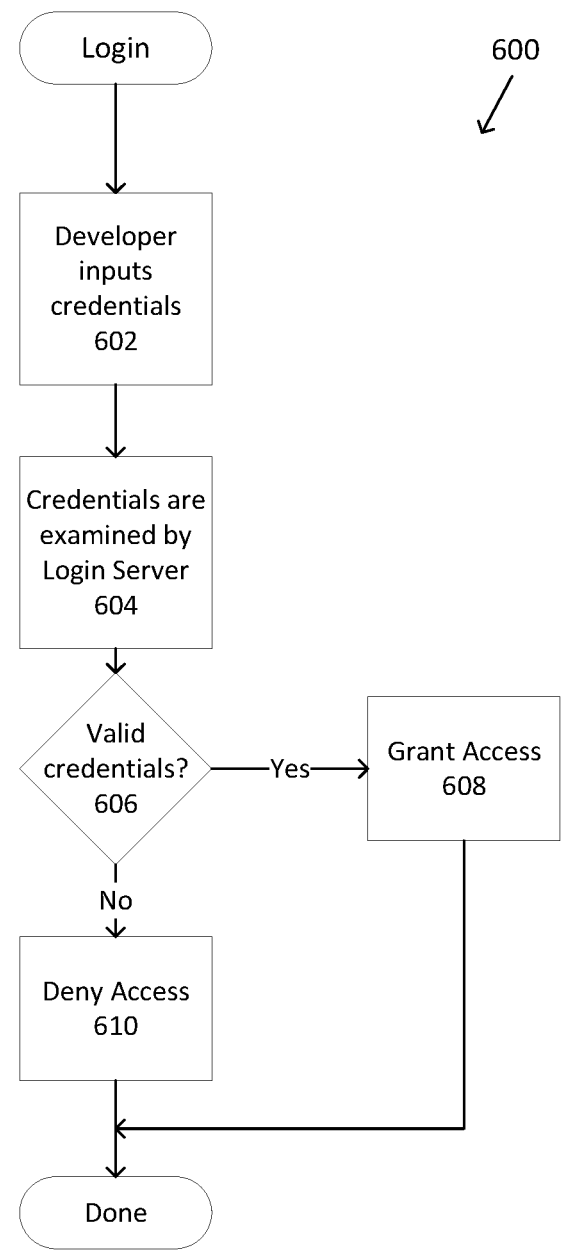
FIG. 6 depicts a flowchart illustrating steps that may be performed in logging into the API monitoring and validation tool in an exemplary embodiment.

FIG. 6 depicts a flowchart 600 illustrating the steps that may be performed during the login 502 (FIG. 5). Initially, a developer enters their credentials (602). This may entail, for example, entering a username and password for the developer. These credentials are examined by a login server (604) provided by the API monitoring and validation component.

If the credentials are proper (606), access to the API monitoring and validation component is granted (608). If not, access is denied (610).

Figure 7:
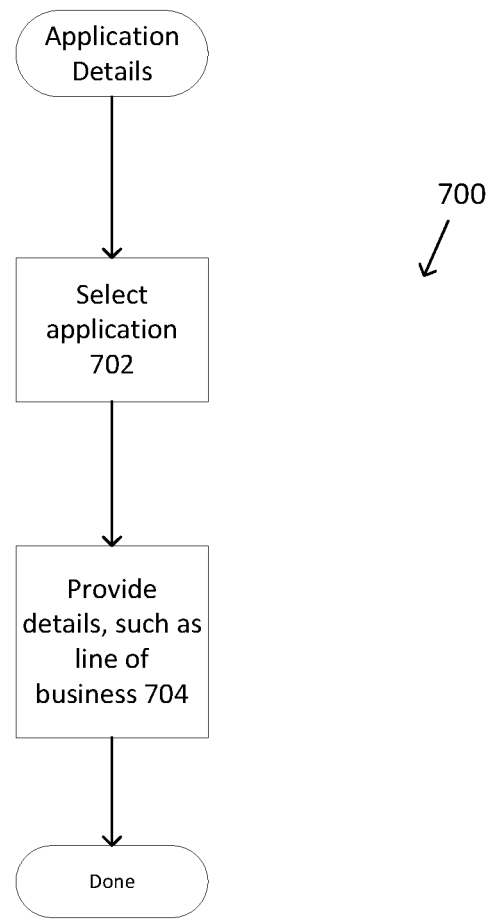
FIG. 7 depicts a flowchart illustrating steps that may be performed during onboarding of an application to provide details regarding the application in an exemplary embodiment.

FIG. 7 depicts a flowchart 700 of steps that may be performed as part of providing application details 504 (FIG. 5). The process begins with the selection of the application to be onboarded (702). The developer may then provide application details (704). Application details may include information such as the application name, the line of business associated with the application (e.g., accounting), product code and other application specific information.

Figure 8:
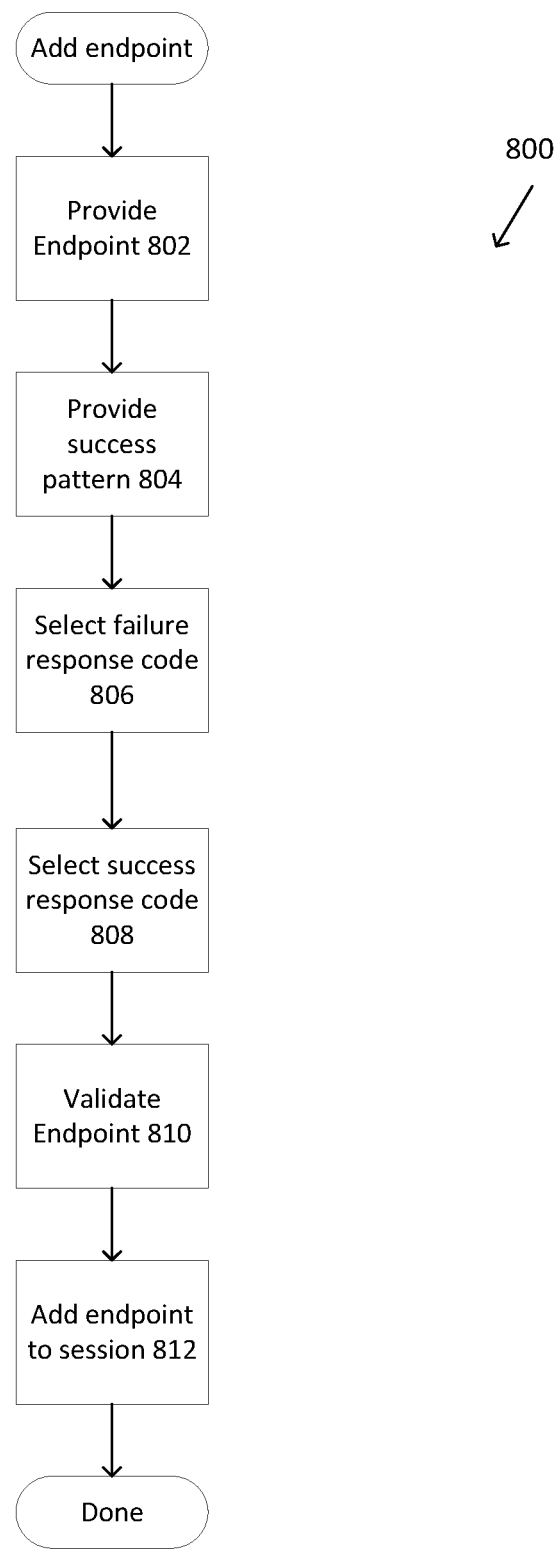
FIG. 8 depicts a flowchart illustrating steps that may be performed in adding an endpoint in an exemplary embodiment.

FIG. 8 depicts a flowchart 800 depicting steps that may be performed in adding an endpoint as part of adding the service endpoints 506 (FIG. 5). Initially, the service endpoint is provided (802). The service endpoint needs to be validated, so a successful response to an API call to the service endpoint is established by a providing a pattern for a successful response by the service endpoint (804). This may entail specifying the successful response in a regular expression, such as in part of a schema generated for the service endpoint. The developer may specify a success response code, such as a REST HTTP status code, (806) and a failure response code (808). The endpoint may then be validated by performing pattern matching validation (810). Once the endpoint is validated, it may be added to the session for testing (812), which includes the monitoring.

Figure 9:
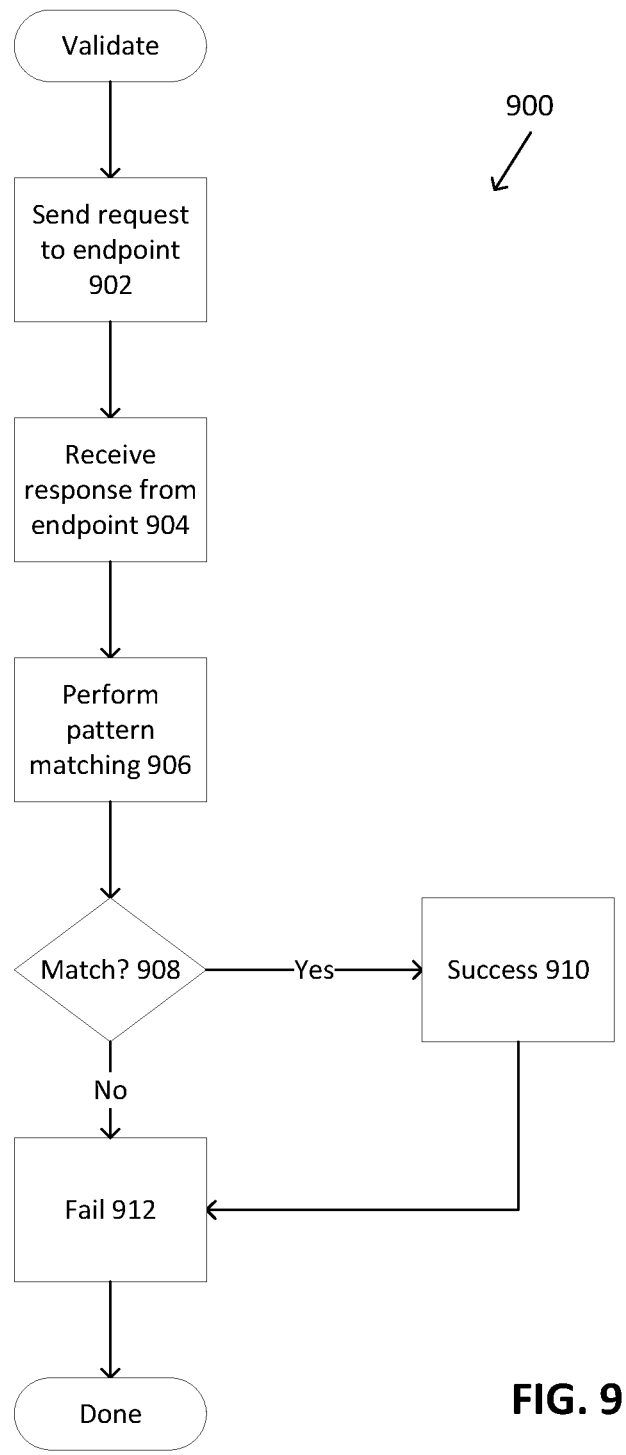
FIG. 9 depicts a flowchart illustrating steps that may be performed in validating an endpoint in an exemplary embodiment.

FIG. 9 depicts a flowchart 900 that shows in more detail the steps performed to validate the endpoint. A request is sent to the service endpoint (902). The service endpoint responds to the request, and the response is received by the validation component (904). Pattern matching is performed on the response by comparing the response to the regular expression for a successful response (906). A determination is made whether there is a match (908). A match requires an exact pattern match or in some embodiments a substantial match (such as 90% of the characters in the response match the regular expression, or only portions of the response need to be an exact match). If there is a match, the response is deemed a success (910) and if not, the response is deemed a failure (912). The validation may require multiple successful responses before the endpoint is validated.

Figure 10:
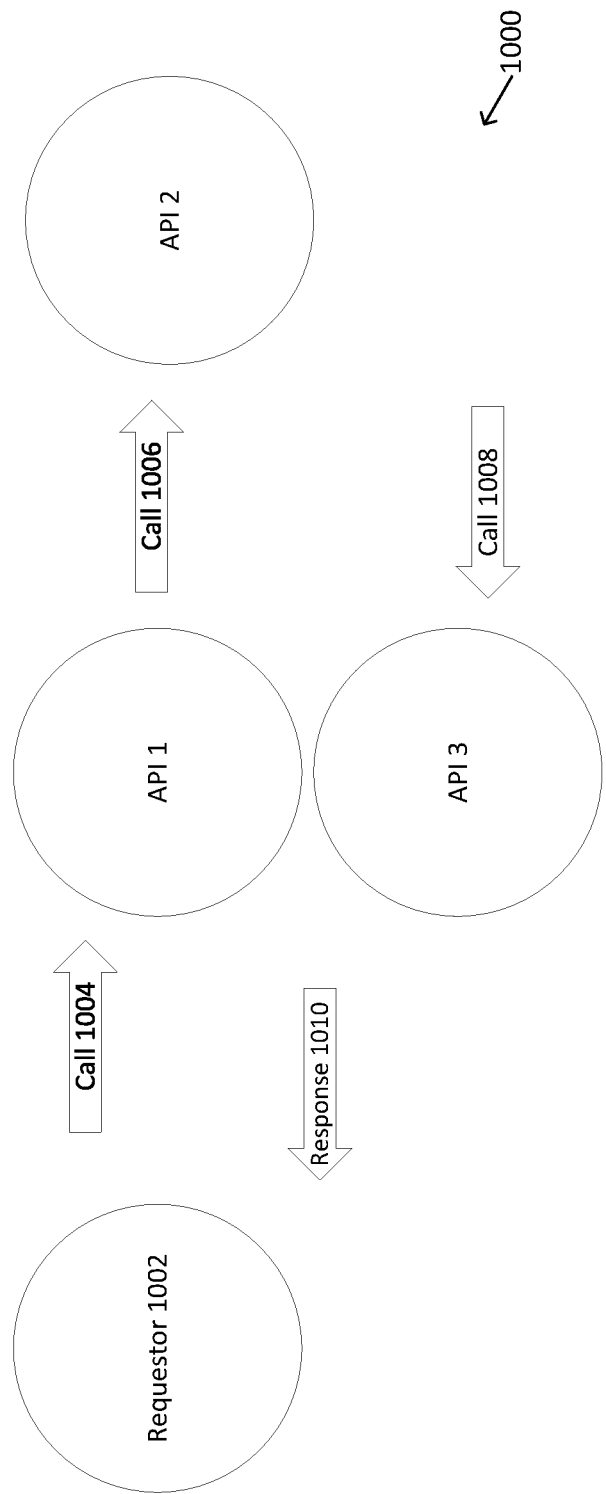
FIG. 10 depicts an example of an illustrative API call chain.

FIG. 10 depicts an illustrative API call chain 1000. A requestor 1002, such as an application program makes a call 1004 to API 1. API 1 makes a call 1006 to API 2, which in turn, makes a call 1008 to API 3. API 3 then sends a response 1010 back to the requestor 1002.

As was mentioned above, the exemplary embodiments make properly handle validation and testing of applications that include such API call chains. The response returned to the requestor may be validated. Logs for the service endpoints may be examined to determine the causes of errors and failures in API call chains. In this manner, the exemplary embodiments facilitate determining the root cause of a failure or error in a call chain and do not report only that there is an error or failure somewhere in the call chain.

Figure 11:
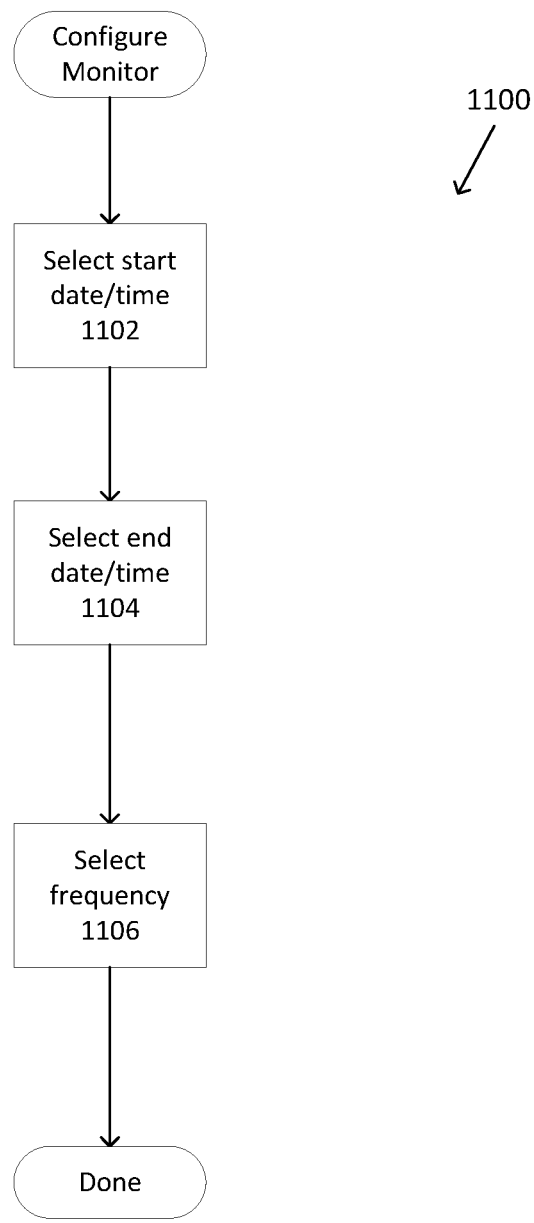
FIG. 11 depicts a flowchart illustrating steps that may be performed in configuring monitoring in the API monitoring and validation component in an exemplary embodiment.

As was mentioned above, a developer may configure the monitoring of the service endpoints for an application. FIG. 11 depicts a flowchart of steps 1100 that may be performed to configure the monitoring in an exemplary embodiment. The developer may select a start date and time for the monitoring (1102) as part of testing of the application. The developer may also select the end date and time for the monitoring (1104). The developer may select the frequency of the monitoring (1106) (e.g., every 15 minutes). More generally, the developer may in other embodiments select how often monitoring occurs and may select the time period for monitoring in other ways.

The monitoring may check the health of service endpoint during the testing. The monitoring may note a current status of a service endpoint, such as available, not available, failed, has an error and may gather log information relating to the status for further analysis. The monitoring may also gather data and measure metrics relating to the service endpoint. For example, the monitoring may determine how often a service endpoint is available, how often the service endpoint fails, how often the service endpoint has an error, what errors occurred, what caused failures, what caused errors, etc.

Figure 12:
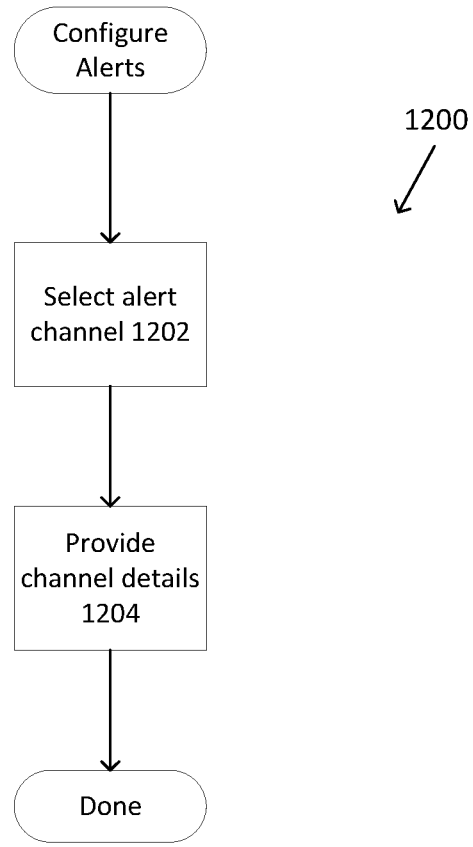
FIG. 12 depicts a flowchart illustrating steps that may be performed in configuring alerts with the API monitoring and validation component in an exemplary embodiment.

As was mentioned above, a user interface may be provided for configuring the alerts that are triggered by the monitoring. FIG. 12 provides a flowchart 1200 of steps that may be performed in an exemplary embodiment to configure the alerts. Initially, the user chooses the alert channel for an alert (1202). The alert channel may specify how the alert is sent, such as via text, email, phone, page, messaging application or the like. When the alert channel refers to an application like Slack, the alert channel may also specify the Slack channel for the alerts. The channel details are then provided (1204), including what the alert communication is to look like and how it is to be sent.

Figure 13:
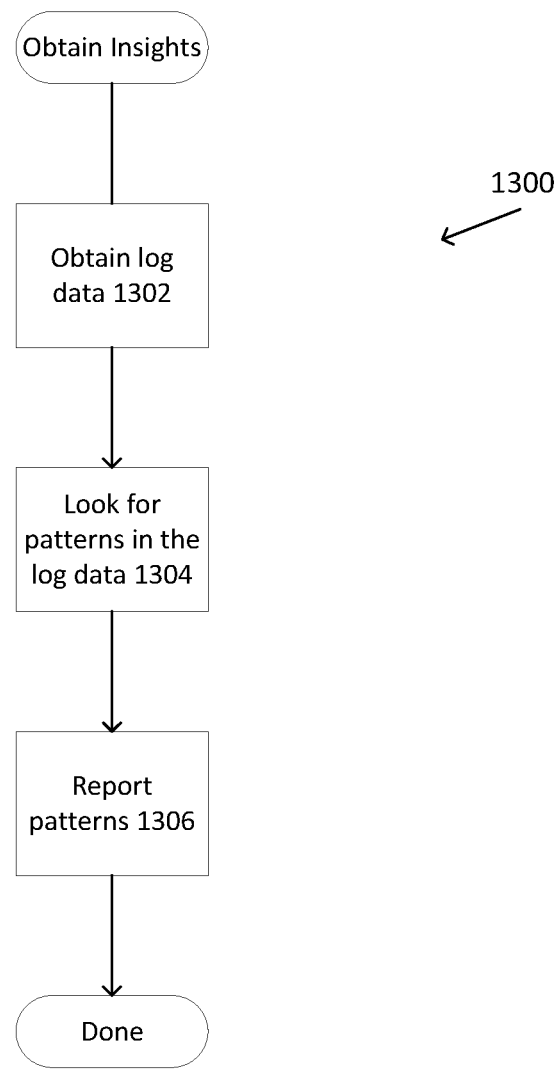
FIG. 13 depicts a flowchart illustrating steps that may be performed in processing log information and metrics to determine insights in an exemplary embodiment.

The log data gathered during the monitoring may be processed to gain insights. FIG. 13 depicts a flowchart 1300 of steps that may be performed in exemplary embodiments to gain insights. The log data for a monitoring session is obtained (1302). Patterns in the log data are programmatically identified (1304) and reported to the developer (1304). Any of a number of different pattern matching algorithms may be used to identify the patterns. These patterns are then produced as insights. For instance, a pattern may be found that indicates when failures most occur or when errors most occur. Other patterns may identify for instance what is the most likely cause of a failure or error for a specified date/time range.

Figure 14:
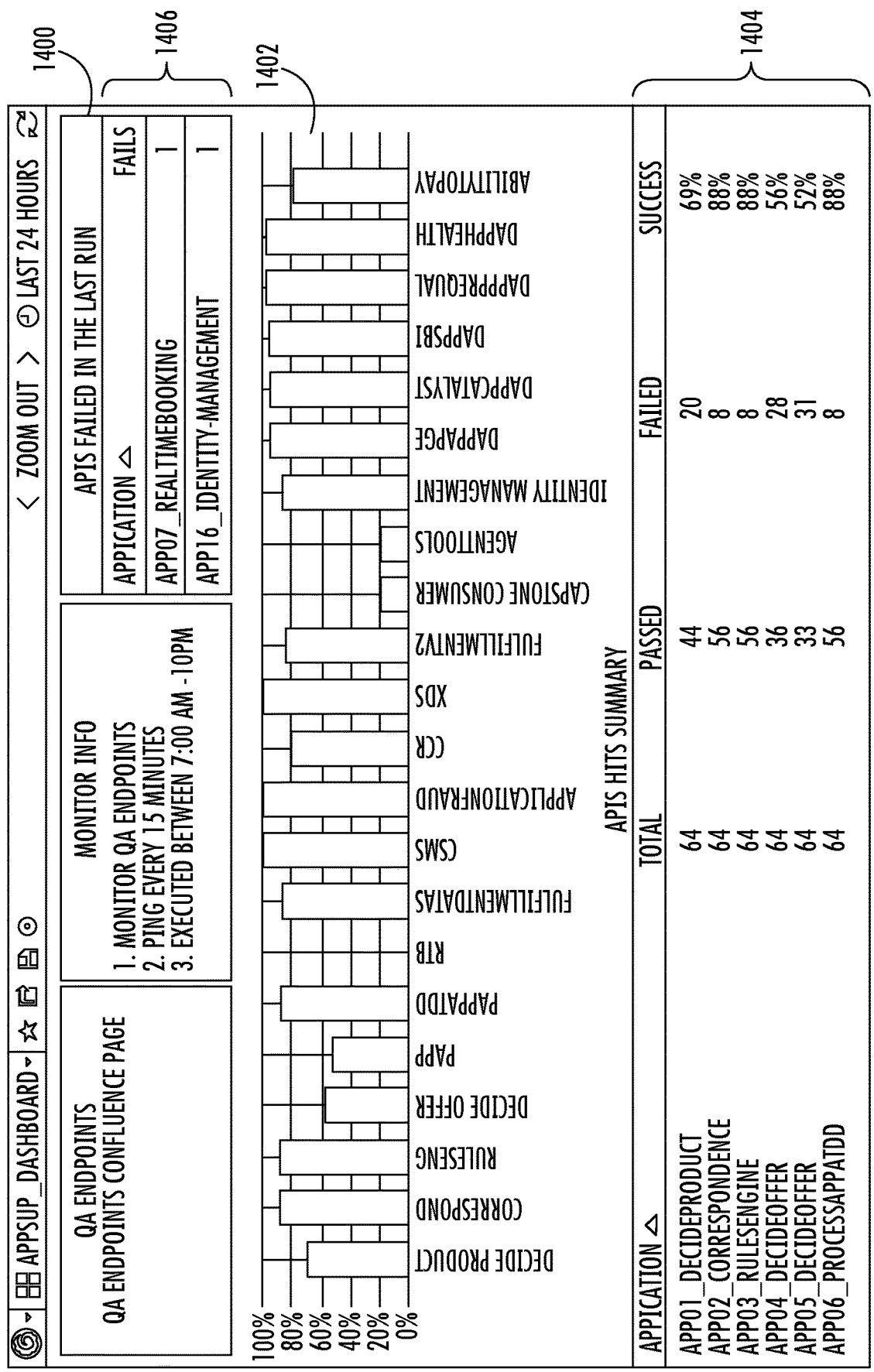
FIG. 14 depicts an illustrative dashboard providing useful monitoring information in an exemplary embodiment.

FIG. 14 shows an example of a dashboard 1400 that may be presented for displaying data and metrics gathered by the monitoring. In the example dashboard shown, histograms of percentage availability for API's for service endpoints 1402 are displayed. A table of API hits 1404 is displayed in tabular form and includes how often the response passed or failed. Table 1406 identifies API's that failed and API's that failed during the last testing run. This dashboard provides useful information to a developer in a readily understood compact format. The dashboard format may be configurable. The format shown in FIG. 14 is intended to be illustrative and not limiting.

While the present invention has been described with reference to exemplary embodiments herein, those skilled in the art will appreciate that the various changes in from and detail may be made without departing from the intended scope as defined in the appended claims.

What is claimed is:

1. A computer-implemented method, comprising:
  initiating programmatic validation of a web application in a web-based environment, wherein the web application employs application program interface (API) chaining for a chain of sequential API calls to endpoints;
  as part of the programmatic validation,
    generating a testing scenario that tests the API chaining, wherein the testing scenario defines a successful response;
    executing the testing scenario that tests the API chaining;
    measuring performance metrics resulting from executing the testing scenario;

programmatically analyzing activity logs for the endpoints to identify failures or problems that arose during the executing of the test scenario, wherein the programmatically analyzing includes:
  analyzing at least one of the activity logs for: (i) at least one of the endpoints upstream in the chain of sequential API calls relative to a selected one of the endpoints, or (ii) at least one of the endpoints downstream in the chain of sequential API calls relative to the selected one of the endpoints, to identify a given failure or a given problem for the selected one of the endpoints; and
  generating an output from a computing device containing information regarding the identified given failure or the given problem at the endpoints.

2. The method of claim 1, wherein the testing scenario is generated responsive to user input.

3. The method of claim 1, wherein the successful response is defined by a regular expression.

4. The method of claim 3, wherein an unsuccessful response is when the unsuccessful response does not match the regular expression.

5. The method of claim 1, further comprising identifying one or more causes of the given failure or the given problem.

6. The method of claim 5, further comprising generating a report of the given failure or the given problem as the output.

7. A computer-implemented method, comprising:
  transmitting content for a user interface to a client in a web-based computing environment to schedule monitoring of a selected service endpoint during testing of the service endpoint, wherein the service endpoint is part of a chain of sequential API calls to service endpoints that include the selected service endpoint as well as an upstream service endpoint that is upstream from the selected service endpoint in the chain and a downstream service endpoint that is downstream from the selected service endpoint in the chain;
  receiving scheduling input from the client, obtained via the user interface, indicative of dates and times at which monitoring of the selected service endpoint is to occur;
  providing alert options via the user interface to configure delivery of alerts for the selected service endpoint;
  monitoring the selected service endpoint responsive to the scheduling input;
  during the monitoring, detecting an error;
  generating an alert that is delivered in accordance with the information identifying how alerts are to be delivered;
  gathering log information regarding the error;
  analyzing the log information for the upstream service endpoint and/or the downstream service endpoint to identify the error; and
  generating output on a display device reporting the error and information regarding the error from the log information.

8. The method of claim 7, wherein the scheduling input specifies a start date and an end date for the monitoring.

9. The method of claim 7, wherein the scheduling input specifies a frequency of the monitoring during a monitoring period.

10. The method of claim 7, wherein the user interface is part of a webpage.

11. The method of claim 7, wherein the alert options include at least one of email, text, a messaging application, pager, phone or an application program.

12. The method of claim 7, further comprising gathering metrics regarding the selected service endpoint during monitoring and displaying the metrics.

13. The method of claim 12, wherein at least one of the metrics concerns availability of the selected service endpoint.

14. The method of claim 13, wherein the metrics include a measure of how often an application program interface (API) fails.

\* \* \* \* \*